(12) United States Patent
Hashimoto et al.

(10) Patent No.: US 8,153,547 B2
(45) Date of Patent: Apr. 10, 2012

(54) PHOTOCATALYST MATERIAL, PROCESS FOR PRODUCING THE PHOTOCATALYST MATERIAL, AND METHOD FOR DECOMPOSING CONTAMINANT USING THE MATERIAL

(75) Inventors: Kazuhito Hashimoto, Bunkyo-ku (JP); Hiroshi Irie, Yamanashi (JP); Ryuhei Nakamura, Bunkyo-ku (JP); Shuhei Miura, Tokyo (JP)

(73) Assignee: The University of Tokyo, Tokyo (JP)

( * ) Notice: Subject to any disclaimer, the term of this patent is extended or adjusted under 35 U.S.C. 154(b) by 125 days.

(21) Appl. No.: 12/602,955

(22) PCT Filed: Jun. 4, 2008

(86) PCT No.: PCT/JP2008/060271
§ 371 (c)(1),
(2), (4) Date: Mar. 25, 2010

(87) PCT Pub. No.: WO2008/149889
PCT Pub. Date: Dec. 11, 2008

(65) Prior Publication Data
US 2011/0129298 A1   Jun. 2, 2011

(30) Foreign Application Priority Data
Jun. 5, 2007   (JP) ................. 2007-149049

(51) Int. Cl.
*B01J 23/00* (2006.01)
*B01J 23/70* (2006.01)
*B01J 23/74* (2006.01)
*B01J 23/02* (2006.01)
*B01J 23/06* (2006.01)
*B01J 23/04* (2006.01)
*B01J 23/72* (2006.01)
*C02F 1/32* (2006.01)

(52) U.S. Cl. ........ 502/300; 502/338; 502/340; 502/343; 502/344; 502/345; 502/349; 502/353; 210/748.14

(58) Field of Classification Search .................. 502/338, 502/340, 343, 344, 345, 349, 353, 300; 210/748.14
See application file for complete search history.

(56) References Cited

U.S. PATENT DOCUMENTS
5,332,508 A * 7/1994 Foster et al. .................. 210/711
(Continued)

FOREIGN PATENT DOCUMENTS
JP       2004-073910 A       3/2004

OTHER PUBLICATIONS
Liu et al., "Interfacial synthesis of platinum loaded polyaniline nanowires in poly(styrene sulfonic acid)", Materials Letters 61 (2007) 4400-4405, Published Online: Feb. 17, 2007.*

(Continued)

*Primary Examiner* — Steven Bos
*Assistant Examiner* — Anthony J Zimmer
(74) *Attorney, Agent, or Firm* — Sughrue Mion, PLLC

(57) ABSTRACT

This invention provides a photocatalyst material, which can be produced at low cost without using platinum, particularly a visible light response-type photocatalyst material, a material having a photocatalyst mechanism not possessed by the conventional photocatalyst material, a process for producing the material, and a method for decomposing a contaminant using the material. The photocatalyst material comprises a) an oxide of a first metal and b) an aqua complex salt of a second metal. In this case, for the oxide of a first metal, the redox potential of a conduction band lower end in the oxide is on a rather negative side than 0.2 V (a value as measured at pH=0, vs. reference electrode potential). For the aqua complex salt of a second metal, the redox potential of a second metal ion in the aqua complex salt is on a rather negative side than 3.0 V (a value as measured at pH=0, vs. reference electrode potential). In the material, the aqua complex salt of a second metal is chemically adsorbed on the oxide of a first metal.

5 Claims, 3 Drawing Sheets

U.S. PATENT DOCUMENTS 6,464,951 B1 * 10/2002 Kittrell et al. ............. 423/240 R
2005/0072742 A1 * 4/2005 Li et al. ........................ 210/748

OTHER PUBLICATIONS

Boccuzzi et al., "Preparation, Characterization, and Activity of Cu/TiO2 Catalysts", Journal of Catalysis 165, 129-139 (1997).*

Paola et al., "Preparation of Polycrystalline TiO2 Photocatalysts Impregnated with Various Transition Metal Ions: Characterization and Photocatalytic Activity for the Degradation of 4-Nitrophenol", J. Phy. Chem. B 2002, 106, 637-645.*

* cited by examiner ing the photocatalyst material. More, the present invention
PHOTOCATALYST MATERIAL, PROCESS FOR PRODUCING THE PHOTOCATALYST MATERIAL, AND METHOD FOR DECOMPOSING CONTAMINANT USING THE MATERIAL

TECHNICAL FIELD

The present invention relates to a photocatalyst material, in particular, a photocatalyst material responsive to visible light. Further, the present invention relates to a process for producing the photocatalyst material. More, the present invention relates to a method for decomposing a contaminant using the photocatalyst material.

BACKGROUND ART

A photocatalyst has a high capacity of oxidizing and decomposing, for example, organic matters or apart of inorganic substances such as NOx. And, the light which is available at low cost and has a small environmental load may be used as an energy source. Therefore, in recent years, the application of the photocatalyst to environmental clean-up, deodorization, antifouling, and sterilization has been advanced, and various photocatalysts have been developed and studied.

Among them, the photocatalyst material responsive to visible light is expected, and thus, the study and development thereof have been progressed.

For example, Patent document 1 discloses a photocatalyst responsive to visible light in which a halogenated platinum compound (0.01 to 1% by weight, calculated based on platinum) is supported on the surface of catalyst particles such as titanium oxide.

Patent document 1: Japanese Patent Application Laid-Open No. 2004-73910.

DISCLOSURE OF THE INVENTION

Problems to be solved by the Invention

However, although the photocatalyst material disclosed in Patent document 1 has a very small amount of platinum (0.01 to 1% by weight, calculated in platinum equivalent), the use of platinum in itself causes the high cost of the material.

Further, the fact of needs for the photocatalyst responsive to visible light still remains.

An object of the present invention is to solve the above-described problems and meet the needs.

Specifically, the object of the present invention is to provide a photocatalyst material without using platinum, which may be produced at low cost, in particular, a photocatalyst responsive to visible light.

In addition to, or other than the above-described objects, the object of the present invention is to provide a material having a photocatalyst mechanism which is not included in the conventional photocatalyst material, a process for producing the material, and a method for decomposing a contaminant using the photocatalyst material.

Means for Solving Problems

The present inventors earnestly studied in order to achieve the above objects, and have found following inventions:

<1> A photocatalyst material comprising: a) an oxide of a 1st metal; and b) an aqua complex of a 2nd metal;

wherein the redox potential of lower end in a conduction band of the oxide of the 1st metal is on the negative side of and inclusive of 0.2 V (vs. standard electrode potential, at pH=0), preferably 0.0 to −0.6 V (vs. standard electrode potential, at pH=0), more preferably −0.046 to −0.6 V (vs. standard electrode potential, at pH=0);

the redox potential of a 2nd metal ion in the aqua complex of the 2nd metal is on the negative side of and inclusive of 3.0 V (vs. standard electrode potential, at pH=0), preferably 2.0 to 3.0V (vs. standard electrode potential, at pH=0), more preferably 2.3 to 3.0 V (vs. standard electrode potential, at pH=0); and in the material, the aqua complex of the 2nd metal is chemically adsorbed on the oxide of the 1st metal.

<2> In the above item <1>, an electron of the 2nd metal ion in the aqua complex may be excited into the conduction band of the oxide of a 1st metal by light irradiation, thereby to cause photocatalysis.

<3> In the above item <1> or <2>, a) the oxide of the 1st metal may be selected from the group consisting of $TiO_2$, $ZrO_2$, $ZnO$, $Ta_2O_5$, $Nb_2O_5$, $SrTiO_3$, $NaTaO_3$, $KTaO_3$, $NaNbO_3$ and $KNbO_3$, preferably $TiO_2$ or $ZnO$, more preferably $TiO_2$.

<4> In any one of the above items <1> to <3>, b) the 2nd metal ion may be selected from the group consisting of $Cr^{3+}$, $Ce^{3+}$, $Co^{2+}$, $Ag^+$, $Ni^{4+}$ and $Mn^{2+}$, preferably $Cr^{3+}$.

<5> In any one of the above items <1> to <4>, the photocatalyst material may be a type responsive to visible light. In a case where the photocatalyst material is the type responsive to visible light, a) the oxide of the 1st metal may be selected from the group consisting of $TiO_2$, $ZnO$, $Ta_2O_5$, $Nb_2O_5$, $SrTiO_3$, $NaTaO_3$, $KTaO_3$, $NaNbO_3$ and $KNbO_3$, preferably $TiO_2$ or $ZnO$, more preferably $TiO_2$.

<6> A photocatalyst material comprising: a) an oxide of a 1'st metal; and b) an aqua complex of a 2'nd metal;

wherein the redox potential of a valence band of the oxide of the 1'st metal is on the positive side of and inclusive of 2.0 V (vs. standard electrode potential, at pH=0), preferably 2.6 to 3.4 V (vs. standard electrode potential, at pH=0), more preferably 2.8 to 3.4 V (vs. standard electrode potential, at pH=0);

the redox potential of a 2'nd metal ion in the aqua complex of the 2'nd metal is on the negative side of and inclusive of 1.1 V (vs. standard electrode potential, at pH=0), preferably on the negative side of and inclusive of 0.46 V (vs. standard electrode potential, at pH=0), more preferably −0.046 to −0.2 V (vs. standard electrode potential, at pH=0); and the aqua complex of the 2'nd metal is chemically adsorbed on the oxide of the 1'st metal.

<7> In the above item <6>, an electron in the valence band of the oxide of 1'st metal may be excited into the 2'nd metal ion of the aqua complex by light irradiation, thereby to cause photocatalysis.

<8> In the above item <6> or <7>, a') the oxide of the 1'st metal may be selected from the group consisting of $TiO_2$, $ZrO_2$, $ZnO$, $Ta_2O_5$, $Nb_2O_5$, $SrTiO_3$, $NaTaO_3$, $KTaO_3$, $NaNbO_3$ and $KNbO_3$, preferably $TiO_2$ or $ZnO$, more preferably $TiO_2$.

<9> In any one of the above items <6> to <8>, the 2'nd metal ion may be $Cu^{2+}$ or $Fe^{3+}$.

<10> In any one of the above items <6> to <9>, the photocatalyst material may be a type responsive to visible light. In a case where the photocatalyst material is the type responsive to visible light, a') the oxide of the 1'st metal may be selected from the group consisting of $TiO_2$, $ZrO$, $ZnO$, $Ta_2O_5$, $Nb_2O_5$, $SrTiO_3$, $NaTaO_3$, $KTaO_3$, $NaNbO_3$ and $KNbO_3$, preferably $TiO_2$ or $ZnO$, more preferably $TiO_2$.

<11> A process for producing a photocatalyst material comprising a) an oxide of a 1st metal; and b) an aqua complex of a 2nd metal; wherein the aqua complex of the 2nd metal is chemically adsorbed on the oxide of the 1st metal, wherein the redox potential of lower end in a conduction band of the oxide of the 1st metal is on the negative side of and inclusive of 0.2 V (vs. standard electrode potential, at pH=0), preferably 0.0 to −0.6 V (vs. standard electrode potential, at pH=0), more preferably −0.046 to −0.6 V (vs. standard electrode potential, at pH=0);

the redox potential of a 2nd metal ion in the aqua complex of the 2nd metal is on the negative side of and inclusive of 3.0 V (vs. standard electrode potential, at pH=0), preferably 2.0 to 3.0 V (vs. standard electrode potential, at pH=0) more preferably 2.3 to 3.0 V (vs. standard electrode potential, at pH=0); and the process comprises the steps of:
i) suspending the oxide of the 1st metal in water to produce a suspension;
ii) adding a 2nd metal ion source to the suspension;
iii) heating the resulting liquid at 40 to 100° C., preferably 80 to 95° C.;
iv) filtering the resulting liquid, followed by washing, to produce fine particles; and
v) drying the resulting fine particles at 50 to 300° C., preferably 100 to 130° C., to produce the photocatalyst material.

<12> In the above item <11>, the step iv) may be repeated plural times.

<13> In the above item <11> or <12>, a) the oxide of the 1st metal may be selected from the group consisting of $TiO_2$, $ZrO_2$, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<14> In any one of the above items <11> to <13>, b) the 2nd metal ion may be selected from the group consisting of $Cr^{3+}$, $Ce^{3+}$, $Co^{2+}$, $Ag^+$, $Ni^{4+}$ and $Mn^{2+}$, preferably $Cr^{3+}$.

<15> In any one of the above items <11> to <14>, the photocatalyst material may be a type responsive to visible light. In a case where the photocatalyst material is the type responsive to visible light, a) the oxide of the 1st metal may be selected from the group consisting of $TiO_2$, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<16> A process for producing a photocatalyst material comprising a) an oxide of a 1'st metal; and b) an aqua complex of a 2'nd metal; wherein the aqua complex of the 2'nd metal is chemically adsorbed on the oxide of the 1'st metal, wherein the redox potential of a valence band of the oxide of the 1'st metal is on the positive side of and inclusive of 2.0 V (vs. standard electrode potential, at pH=0), preferably 2.6 to 3.4 V (vs. standard electrode potential, at pH=0), more preferably 2.8 to 3.4 V (vs. standard electrode potential, at pH=0);

the redox potential of a 2'nd metal ion in the aqua complex of the 2'nd metal is on the negative side of and inclusive of 1.1 V (vs. standard electrode potential, at pH=0), preferably on the negative side of and inclusive of 0.46 V (vs. standard electrode potential, at pH=0), more preferably −0.046 to −0.2 V (vs. standard electrode potential, at pH=0); and the process comprises the steps of:
i') suspending the oxide of the 1'st metal in water to produce a suspension;)
ii') adding the 2'nd metal ion source to the suspension;
iii') heating the resulting liquid at 40 to 100° C., preferably 80 to 95° C.;
iv') filtering the resulting liquid, followed by washing, to produce fine particles; and
v') drying the resulting fine particles at 50 to 300° C., preferably 100 to 130° C., to produce the photocatalyst material.

<17> In the above item <16>, the step iv') may be repeated plural times.

<18> In the above item <16> or <17>, a') the oxide of the 1'st metal may be selected from the group consisting of $TiO_2$, $ZrO_2$, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<19> In any one of the above items <16> to <18>, the 2'nd metal ion may be $Cu^{2+}$ or $Fe^{3+}$.

<20> In any one of the above items <16> to <19>, the photocatalyst material may be a type responsive to visible light. In a case where the photocatalyst material is the type responsive to visible light, a') the oxide of the st metal may be selected from the group consisting of $TiO_2$, ZrO, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<21> A method for decomposing a contaminant by using a photocatalyst material comprising a) an oxide of a 1st metal; and b) an aqua complex of a 2nd metal;

wherein the redox potential of lower end in a conduction band of the oxide of the 1st metal is on the negative side of and inclusive of 0.2 V (vs. standard electrode potential, at pH=0), preferably 0.0 to −0.6 V (vs. standard electrode potential, at pH=0), more preferably −0.046 to −0.6 V (vs. standard electrode potential, at pH=0);

the redox potential of a 2nd metal ion in the aqua complex of the 2nd metal is on the negative side of and inclusive of 3.0 V (vs. standard electrode potential, at pH=0) preferably 2.0 to 3.0 V (vs. standard electrode potential, at pH=0), more preferably 2.3 to 3.0 V (vs. standard electrode potential, at pH=0);

in the material, the aqua complex of the 2nd metal is chemically adsorbed on the oxide of the 1st metal, the method comprises the steps of:
irradiating the photocatalyst material with light to excite an electron in the 2nd metal ion of the aqua complex into the conduction band of the oxide of the 1st metal, and decomposing a contaminant by the effect of the excited electron.

<22> In the above item <21>, a) the oxide of the 1st metal may be selected from the group consisting of $TiO_2$, $ZrO_2$, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<23> In the above item <22> or <22>, b) the 2nd metal ion may be selected from the group consisting of $Cr^{3+}$, $Ce^{3+}$, $Co^{2+}$, $Ag^+$, $Ni^{4+}$ and $Mn^{2+}$, preferably $Cr^{3+}$.

<24> In any one of the above items <21> to <23>, the photocatalyst material may be a type responsive to visible light. In a case where the photocatalyst material is the type responsive to visible light, a) the oxide of the 1st metal may be selected from the group consisting of $TiO_2$, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<25> A method for decomposing a contaminant by using a photocatalyst material comprising a') an oxide of a 1'st metal; and b') an aqua complex of a 2'nd metal;

wherein the redox potential of a valence band of the oxide of the 1'st metal is on the positive side of and inclusive of 2.0 V (vs. standard electrode potential, at pH=0), preferably 2.6 to 3.4 V (vs. standard electrode potential, at pH=0), more preferably 2.8 to 3.4 V (vs. standard electrode potential, at pH=0);

the redox potential of a 2'nd metal ion in the aqua complex of the 2'nd metal is on the negative side of and inclusive of 1.1

V (vs. standard electrode potential, at pH=0), preferably on the negative side of and inclusive of 0.46 V (vs. standard electrode potential, at pH=0), more preferably −0.046 to −0.2 V (vs. standard electrode potential, at pH=0);

the aqua complex of the 2'nd metal is chemically adsorbed on the oxide of the 1'st metal, and the method comprises the steps of:

irradiating the photocatalyst material with light to excite an electron in the valence band of the oxide into the 2'nd metal ion in aqua complex, and decomposing a contaminant by the effect of the excited electron.

<26> In the above item <25>, a') the oxide of the 1'st metal may be selected from the group consisting of $TiO_2$, $ZrO_2$, ZnO, $Ta_2O_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

<27> In the above item <25> or <26>, the 2'nd metal ion may be $Cu^{2+}$ or $Fe^{3+}$.

<28> In any one of the above items <25> to <27>, the photocatalyst material may be a type responsive to visible light. In a case where the photocatalyst material is the type responsive to visible light, a') the oxide of the 1'st metal may be selected from the group consisting of $TiO_2$, ZrO, ZnO, $Ta_2Q_5$, $Nb_2O_5$, $SrTiO_3$, $NaTaO_3$, $KTaO_3$, $NaNbO_3$ and $KNbO_3$, preferably $TiO_2$ or ZnO, more preferably $TiO_2$.

Effects of the Invention

The present invention can provide a photocatalyst material without using platinum, which may be produced at low cost, in particular, a photocatalyst responsive to visible light.

In addition to, or other than the above-described effects, the present invention can provide a material having a photocatalyst mechanism which is not included in the conventional photocatalyst material, a process for producing the material, and a method for decomposing a contaminant using the photocatalyst material.

BEST MODE FOR CARRYING OUT THE INVENTION

Hereinafter, the present invention will be described in detail.

The present invention provides the material having the photocatalyst mechanism which is not included in the conventional photocatalyst material, the process for producing the material, and the method for decomposing a contaminant using the photocatalyst material. Hereinafter, the material, the process for producing the material, and the method for decomposing a contaminant by using the material will be described in this order.

<Materials>

The present invention provides a photocatalyst material comprising (1) a) an oxide of a 1st metal; and b) an aqua complex of a 2nd metal; or (2) a') an oxide of a 1'st metal; and b') an aqua complex of a 2'nd metal. Furthermore, the photocatalysis mechanism of the photocatalyst material (1) is different from that of the photocatalyst material (2), and thus, the photocatalyst material (1) may be abbreviated as "Scheme 1" and the photocatalyst material (2) as "Scheme 2". Sometimes, these materials are separately described, and sometimes they are described as the same materials.

<<Scheme 1>>

The material of Scheme 1 of the present invention comprises a) the oxide of a 1st metal; and b) the aqua complex of a 2nd metal.

The redox potential of lower end in a conduction band of a) the oxide of a 1st metal may be on the negative side of and inclusive of 0.2 V (vs. standard electrode potential, at pH=0), preferably from 0.0 to −0.6 V (vs. standard electrode potential, at pH=0), more preferably from −0.046 to −0.6 V (vs. standard electrode potential, at pH=0).

Examples of a) the oxide of the 1st metal may include, but are not limited to, $TiO_2$, $ZrO_2$, ZnO, $Ta_2O_5$, $Nb_2O_5$, $SrTiO_3$, $NaTaO_3$, $KTaO_3$, $NaNbO_3$, and $KNbO_3$, preferably $TiO_2$ or ZnO, more preferably $TiO_2$.

The redox potential of a 2nd metal ion in b) the aqua complex of a 2nd metal may be on the negative side of and inclusive of 3.0 V (vs. standard electrode potential, at pH=0), preferably from 2.0 to 3.0 V (vs. standard electrode potential, at pH=0), more preferably from 2.3 to 3.0 V (vs. standard electrode potential, at pH=0).

The 2nd metal ion in b) the aqua complex of a 2nd metal may be selected from the group consisting of $Cr^{3+}$, $Ce^{3+}$, $Co^{2+}$, $Ag^+$, $Ni^{4+}$, and $Mn^{2+}$, preferably $Cr^{3+}$.

Therefore, the aqua complex of a 2nd metal may be an aqua complex with the above-mentioned cation.

Further, b) the aqua complex of a 2nd metal may be chemically adsorbed on the oxide of a 1st metal. The term "chemically adsorbed" used herein means the adsorption through any chemical bond. The chemical bond may include, for example, an oxygen cross-linked type intermetallic bond (for example, when a 1st metal is Ti and a 2nd metal is Cr: $Ti^{4+}$—$O^{2-}$—$Cr^{3+}$) in which a 1st metal and a 2nd metal are bound through oxygen.

Examples of the material of Scheme 1 may include, but are not limited to, the following materials. Hereinafter, x represents a binding site when the aqua complex of a 2nd metal is chemically adsorbed on the oxide of a 1st metal.

Examples of the combination of $TiO_2$ and the aqua complex may include a combination of $TiO_2$ and $[Cr(H_2O)_{6-x}]^{3+}$ salt, a combination of $TiO_2$ and $[Ce(H_2O)_{6-x}]^{3+}$ salt, a combination of $TiO_2$ and $[Co(H_2O)_{6-x}]^{2+}$ salt, a combination of $TiO_2$ and $[Ag(H_2O)_{4-x}]^+$ salt, a combination of $TiO_2$ and $[Ni(H_2O)_{6-x}]^{4+}$ salt, and a combination of $TiO_2$ and $[Mn(H_2O)_{6-x}]^{2+}$ salt.

Examples of the combination of $ZrO_2$ and the aqua complex may include a combination of $ZrO_2$ and $[Cr(H_2O)_{6-x}]^{3+}$ salt, a combination of $ZrO_2$ and $[Ce(H_2O)_{6-x}]^{3+}$ salt, a combination of $ZrO_2$ and $[Co(H_2O)_{6-x}]^{2+}$ salt, a combination of $ZrO_2$ and $[Ag(H_2O)_{4-x}]^+$ salt, a combination of $ZrO_2$ and $[Ni(H_2O)_{6-x}]^{4+}$ salt, and a combination of $ZrO_2$ and $[Mn(H_2O)_{6-x}]^{2+}$ salt.

Examples of the combination of ZnO and the aqua complex may include a combination of ZnO and $[Cr(H_2O)_{6-x}]^{3+}$ salt, a combination of ZnO and $[Ce(H_2O)_{6-x}]^{3+}$ salt, a combination of ZnO and $[Co(H_2O)_{6-x}]^{2+}$ salt, a combination of ZnO and $[Ag(H_2O)_{4-x}]^+$ salt, a combination of ZnO and $[Ni(H_2O)_{6-x}]^{4+}$ salt, and a combination of ZnO and $[Mn(H_2O)_{6-x}]^{2+}$ salt.

The material of Scheme 1 according to the present invention has a photocatalyst mechanism different from the conventional one.

The photocatalyst mechanism of the material of Scheme 1 will be described by using FIG. 1. The case where the combination of $TiO_2$ and $[Cr(H_2O)_{6-x}]^{2+}$ salt is used as a material of Scheme 1 is illustrated on the left side of FIG. 1 and the case where the combination of $TiO_2$ and $[Cu(H_2O)_{4-x}]^{2+}$ salt is used as a material of Scheme 2 is illustrated on the right side of FIG. 1.

Hereinafter, the material of Scheme 1 (left side of FIG. 1) will be described.

In the material of Scheme 1, an electron in the 2nd metal (Cr) in the salt ($[Cr(H_2O)_{6-x}]^{3+}$ salt) is excited into the conduction band of the oxide of a 1st metal ($TiO_2$) by light irradiation.

With the electronic excitation, various photocatalysis are caused. For example, the excited electron reduces oxygen ($O_2$) to form $O_2^-$. The $O_2^-$ serves as an initiator of the chain reaction, which allows for the decomposition of other contaminants such as various organic matters. For example, as the result of the excited electron in the valence band of the 2nd metal (Cr), the 2nd metal (Cr) is oxidized and converted into $Cr^{4+}$. When the $Cr^{4+}$ is reduced to $Cr^{3+}$, the contaminant may be decomposed by oxidizing other contaminants such as organic matters.

In the material of Scheme 1 according to the present invention, when the redox potential of lower end in a conduction band of a) the oxide of a 1st metal is from 0.0 to 0.4 V (vs. standard electrode potential, at pH=0), the material of Scheme 1 may function as a photocatalyst responsive to visible light. In this case, for example, a) the oxide of a 1st metal may be selected from the group consisting of $TiO_2$, ZnO, $Ta_2O_5$, $Nb2O_5$, $SrTiO_3$, $NaTaO_3$, $KTaO_3$, $NaNbO_3$, and $KNbO_3$, preferably $TiO_2$ or ZnO, more preferably $TiO_2$.

<<Scheme 2>>

The material of Scheme 2 according to the present invention comprises a') the oxide of a 1'st metal; and b') the aqua complex of a 2'nd metal.

The redox potential of a valence band in a') the oxide of a 1'st metal may be on the positive side of and inclusive of 2.0 V (vs. standard electrode potential, at pH=0), preferably from 2.6 to 3.4 V (vs. standard electrode potential, at pH=0), more preferably from 2.8 to 3.4 V (vs. standard electrode potential, at pH=0).

Examples of a') the oxide of a 1'st metal may include, but are not limited to, $TiO_2$, $ZrO_2$, ZnO, $Ta_2O_5$, $Nb_2O_5$, $SrTiO_3$, $NaTaO_3$, $KTaO_3$, $NaNbO_3$, and $KNbO_3$, preferably $TiO_2$ or ZnO, more preferably $TiO_2$.

The redox potential of a 2'nd metal ion in b') the aqua complex of a 2'nd metal may be on the negative side of and inclusive of 1.1 V (vs. standard electrode potential, at pH=0), preferably on the negative side of and inclusive of 0.46 V (vs. standard electrode potential, at pH=0), more preferably from −0.046 to −0.2 V (vs. standard electrode potential, at pH=0).

Examples of b') the 2'nd metal ion may include $Cu^{2+}$ or $Fe^{3+}$.

Therefore, the aqua complex of a 2'nd metal may be an aqua complex with the above-mentioned cation.

Further, b') the aqua complex of a 2'nd metal may be chemically adsorbed on the oxide of a 1'st metal. The term "chemically adsorbed" used herein is the same definition as described above.

Examples of the material of Scheme 2 may include, but are not limited to, the following materials: Hereinafter, x represents a binding site when the aqua complex of a 2'nd metal is chemically adsorbed on the oxide of a 1'st metal.

Examples of the combination of $TiO_2$ and the aqua complex may include a combination of $TiO_2$ and $[Cu(H_2O)_{4-x}]^{2+}$ salt and a combination of $TiO_2$ and $[Fe(H_2O)_{6-x}]^{3+}$ salt.

Examples of the combination of $ZrO_2$ and the aqua complex may include a combination of $ZrO_2$ and $[Cu(H_2O)_{4-x}]^{2+}$ salt and a combination of $ZrO_2$ and $[Fe(H_2O)_{6-x}]_{3+}$ salt.

Examples of the combination of ZnO and the aqua complex may include a combination of ZnO and $[Cu(H_2O)_{4-x}]^{2+}$ salt and a combination of ZnO and $[Fe(H_2O)_{6-x}]^{3+}$ salt.

The material of Scheme 2 according to the present invention has a photocatalyst mechanism different from the conventional one.

The photocatalyst mechanism of the material of Scheme 2 will be described using FIG. 1 (right side). The case where the combination of $TiO_2$ and $[Cu(H_2O)_{4-x}]^{2+}$ salt is used as the material of Scheme 2 is illustrated on the right side of FIG. 1.

In the material of Scheme 2, an electron of the valence band in the oxide ("$TiO_2$" in FIG. 1 (right side)) reduces the 2' nd metal (Cu) in the aqua complex ($[Cu(H_2O)_{4-x}]^{2+}$ salt) by light irradiation.

With the electronic excitation, various photocatalys is are caused. For example, the excited electron reduces oxygen ($O_2$) to form $O_2^-$. The $O_2^-$ serves as an initiator of the chain reaction, which allows for the decomposition of other contaminants such as various organic matters. Further, as the result of the excited electron in the valence band of the oxide of a 1'st metal, a hole is formed in the valence band. When the electron enters the hole (to be reduced), the contaminant (e.g., organic matters) may be decomposed by oxidizing other contaminants such as organic matters.

In the material of Scheme 2 according to the present invention, when the redox potential of the conduction band in a 1'st metal of a') the oxide of a 1'st metal is positive side than 0 V (vs. standard electrode potential, at pH=0), the material of Scheme 2 may function as a photocatalyst responsive to visible light. In this case, for example, a') the oxide of a 1'st metal may be selected from the group consisting of $TiO_2$, $ZrO_2$, ZnO, $Ta_2O_5$, $Nb_2O_5$, $SrTiO_3$, $NaTaO_3$, $KTaO_3$, $NaNbO_3$, and $KNbO_3$, preferably $TiO_2$ or ZnO, more preferably $TiO_2$.

<Process for Producing the Photocatalyst Material According to the Present Invention>

The photocatalyst material according to the present invention may be produced, for example, in the following manner.

In the photocatalyst material according to the present invention, a) the oxide and b) the aqua complex in the material of Scheme 1 and a') the oxide and b') the aqua complex in the material of Scheme 2 may be used in the production process according to the present invention in the same manner as described above. Therefore, only the process for producing the material of Scheme 1 will be described hereinafter, but that of Scheme 2 will not be described.

The process for producing the photocatalyst material according to the present invention comprises the steps of:
  i) suspending the oxide of a 1st metal in water, to produce a suspension;
  ii) adding a 2nd metal ion source to the suspension;
  iii) heating the resulting liquid at 40 to 100° C., preferably 80 to 95° C.;
  iv) filtering the resulting liquid, followed by washing, to produce fine particles; and
  v) drying the resulting fine particles at 50 to 300° C., preferably 100 to 130° C., to produce the photocatalyst material.

Furthermore, the terms "oxide of a 1st metal" and "aqua complex of a 2nd metal" have the definitions same as described above.

The step i) is a step of suspending the oxide of a 1st metal in a suspending medium, to produce a suspension. The suspending medium is water. Furthermore, any technique may be used for the step as long as a suspension is obtained by suspending the oxide of a 1st metal in the suspending medium. For example, a technique for suspending the oxide may be a procedure having various steps, for example, a technique for producing a suspension of the oxide in vitro, which comprises a step of obtaining the oxide of a 1st metal from alkoxide of a 1st metal.

The step ii) is a step of adding a 2nd metal ion source to the suspension obtained in the step of i). Furthermore, as described above, the above-described examples may be used for the 2nd metal ion: Halide salts, perhalogen acid salts, or nitrate salts of $Cr^{3+}$, $Ce^{3+}$, $CO^{2+}$, $Ag^{+}$, $Ni^{4+}$, or $Mn^{2+}$; or hydrate salts thereof may be used. More specifically, $CrCl_3.6H_2O$, $Cr(ClO_4)_3.6H_2O$, $Cr(NO_3)_3.9H_2O$, and the like may be used.

The step iii) is a step of heating the liquid obtained in the step ii) at 40 to 100° C., preferably 60 to 100° C., more preferably 80 to 95° C. Furthermore, it is operationally convenient to cool the liquid to room temperature after the heating.

The step iv) is a step of filtering the liquid obtained in the step iii) followed by washing, to produce fine particles. The step iv) may be performed plural times, preferably two to ten times. For example, it may be performed two to five times. Furthermore, the fine particles used herein is in a wet state.

The step v) is a step of drying the resulting fine particles at 50 to 300° C., preferably 90 to 200° C., more preferably 100 to 130° C., to produce the photocatalyst material.

The steps may result in the photocatalyst material according to the present invention. Furthermore, if desired, various steps may be included before the step of i) or between each step.

<Method for Decomposing a Contaminant by Using the Photocatalyst Material According to the Present Invention>

As described above, the photocatalyst material according to the present invention has the photocatalyst mechanism different from that of the conventional photocatalyst material. Therefore, a contaminant, i.e., a decomposition target, may be decomposed by using the mechanism.

<<Decomposing Method of Scheme 1>>

An electron in the valence band of a 2nd metal of the aqua complex is excited into the conduction band of a 1st metal in the oxide by irradiating the photocatalyst material of Scheme 1 according to the present invention with light, and then, a contaminant is decomposed by the effect of the excited electron.

More specifically, as described by using FIG. 1 (left side), the excited electron reduces oxygen ($O_2$) to form $O_2^-$. The $O_2^-$ serves as an initiator of the chain reaction, which allows for the decomposition of other contaminants such as various organic matters. Alternatively, as the result of the excited electron of the 2nd metal ion, the 2nd metal is in an oxidized state. When the oxidized state is returned (reduced) to the original state, the contaminant may be decomposed by oxidizing other contaminants such as organic matters.

<<Decomposing Method of Scheme 2>>

An electron in the valence band in the oxide reduces the 2'nd metal ion in the aqua complex by irradiating the photocatalyst material of Scheme 2 according to the present invention with light. A contaminant is decomposed by the effect of the reduced metal ion.

More specifically, as described using FIG. 1 (right side), the excited electron reduces oxygen ($O_2$) to form $O_2^-$. The $O_2^-$ serves as an initiator of the chain reaction, which allows for the decomposition of other contaminants such as various organic matters. Alternatively, as the result of the excited electron in the valence band of the oxide of a 1'st metal, a hole is formed in oxygen (O). When the electron enters the hole (to be reduced), the contaminant (e.g., organic matters) may be decomposed by oxidizing other contaminants such as organic matters.

The target contaminant in the decomposing method in Schemes 1 and 2 is not particularly limited as long as it is a substance which may be oxidized and/or reduced or decomposed by the above-mentioned mechanism. Various contaminants may be listed.

Examples of various contaminants may include, but are not limited to, soil contaminants; contaminated water in refuse disposal facilities and/or soil contaminants by the contaminated water; soil contaminants by contaminated water at an iron-ore mining site, i.e., a so-called yard neighborhood, and/or the contaminated water; and naturally occurring contaminants.

Specific examples may include volatile organic compounds such as organic phosphorus, cyanogen compounds, PCB, dichloromethane, carbon tetrachloride, 1,2-dichloroethane, 1,1-dichloroethylene, cis-1,2-dichloroethylene, 1,1,1-trichloroethane, 1,1,2-trichloroethane, trichloroethylene, tetrachloroethylene, 1,3-dichloropropene, thiuram, simazine, thiobencarb, benzene, toluene, dioxin, or trichlorophenol; NOx, SOx, bromic acid ion, hypochlorous acid ion, hypobromous acid ion; halogenated compounds present in water such as trihalomethane; 2-methylisoborneol and geosmin which are substances responsible for mold odor; and all substances generally referred to as soil contaminants and air contaminants. Further, organic substances other than the above-described substances correspond to a target contaminant in the method according to the present invention.

Among the above-described substances, the substances which may be decomposed by the photocatalyst material, for example, the organic substances, NOx, and SOx are particularly preferable as the contaminant to be decomposed in the present invention.

Further, an organic matter may be listed as the target contaminant in the method according to the present invention. Examples of the organic matter may include formaldehyde which causes sick house syndrome and volatile organic compounds (VOC) such as toluene. Further, examples thereof may include, but are not limited to, volatile chlorinated hydrocarbon substances with a normal pressure boiling point of about 60 to 120° C., such as 1,1,1-trichloroethane, trichloroethylene, tetrachloroethylene, chloroform, carbon tetrachloride, or ethane dichloride.

Hereinafter, the present invention will be illustrated with reference to Examples, but it is not to be construed as being limited thereto.

EXAMPLE 1

<Preparation of $TiO_2$—$[Cr(H_2O)_{6-x}]^{3+}$ Series Photocatalyst Material by the Heating and Filtering Process>

1 g of rutile type titanium dioxide was suspended in 10 g of distilled water. Thereafter, $CrCl_3.6H_2O$ was added thereto so that the weight ratio of Cr based on $TiO_2$ was 0.1 wt %. The suspension was heat-treated at about 90° C. for 1 hour with stirring. Then, the resulting solution was cooled to room temperature. The process of suction filtration and distilled water cleaning was repeated twice, followed by heating and drying at 110° C. for 24 hours, to obtain a sample powder A-1.

EXAMPLES 2 TO 7

Sample powders A-2 to A-7 were obtained by using the heating and filtering process in a manner similar to Example 1 except that the amount of $CrCl_3.6H_2O$ shown in Table 1, in which the weight ratios of Cr based on $TiO_2$ were also shown in Table 1, was used.

EXAMPLE 8

A sample powder A-8 was obtained by using the heating and filtering process in a manner similar to Example 1 except that $Cr(ClO_4)_3.6H_2O$ was used instead of $CrCl_3.6H_2O$ in Example 1.

EXAMPLE 9

A sample powder A-9 was obtained by using the heating and filtering process in a manner similar to Example 1 except that $Cr(NO_3)_3 \cdot 9H_2O$ was used instead of $CrCl_3 \cdot 6H_2O$ in Example 1.

EXAMPLE 10

A sample powder A-10 was obtained by using the heating and filtering process in a manner similar to Example 1 except that $CrF_3 \cdot 4H_2O$ was used instead of $CrCl_3 \cdot 6H_2O$ in Example 1.

EXAMPLE 11

A sample powder A-11 was obtained by using the heating and filtering process in a manner similar to Example 1 except that $CrBr_3 \cdot 6H_2O$ was used instead of $CrCl_3 \cdot 6H_2O$ in Example 1.

COMPARATIVE EXAMPLE 1

The dry-blending process was used instead of the heating and filtering process in Example 1, to obtain a sample powder C-1. Specifically, 1 g of rutile type titanium dioxide and $CrCl_3 \cdot 6H_2O$ in which the weight ratio of Cr based on $TiO_2$ was 0.1 wt % were placed into a mortar, which was subjected to dry blending, to obtain the sample powder C-1.

EXAMPLE 12

A sample powder D-1 was obtained by using the heating and filtering process in a manner similar to Example 1 except that $ZrO_2$ was used instead of $TiO_2$ in Example 1.

EXAMPLE 13

A sample powder E-1 was obtained by using the heating and filtering process in a manner similar to Example 1 except that $CuCl_2 \cdot 2H_2O$ was used instead of $CrCl_3 \cdot 6H_2O$ in Example 1.

EXAMPLES 14 TO 17

Sample powders E-2 to E-5 were obtained by using the heating and filtering process in a manner similar to Example 13 except that the amount of $CuCl_2 \cdot 2H_2O$ shown in Table 1 was used instead of the amount of $CuCl_2 \cdot 2H_2O$ in Example 13, in which the weight ratio of Cu based on $TiO_2$ was also shown in Table 1.

The results of Examples 1 to 17 as well as Comparative example 1 were summarized in Table 1.

TABLE 1

| | Oxide | Salt | Amount of Salt Wt % | Process | Sample |
|---|---|---|---|---|---|
| Example 1 | $TiO_2$ | $CrCl_3 \cdot 6H_2O$ | 0.1 | Heat & Filter | A-1 |
| Example 2 | $TiO_2$ | $CrCl_3 \cdot 6H_2O$ | 0.005 | Heat & Filter | A-2 |
| Example 3 | $TiO_2$ | $CrCl_3 \cdot 6H_2O$ | 0.01 | Heat & Filter | A-3 |
| Example 4 | $TiO_2$ | $CrCl_3 \cdot 6H_2O$ | 0.015 | Heat & Filter | A-4 |
| Example 5 | $TiO_2$ | $CrCl_3 \cdot 6H_2O$ | 0.06 | Heat & Filter | A-5 |
| Example 6 | $TiO_2$ | $CrCl_3 \cdot 6H_2O$ | 0.2 | Heat & Filter | A-6 |
| Example 7 | $TiO_2$ | $CrCl_3 \cdot 6H_2O$ | 0.3 | Heat & Filter | A-7 |
| Example 8 | $TiO_2$ | $Cr(ClO_4)_3 \cdot 6H_2O$ | 0.1 | Heat & Filter | A-8 |
| Example 9 | $TiO_2$ | $Cr(NO_3)_3 \cdot 6H_2O$ | 0.1 | Heat & Filter | A-9 |
| Example 10 | $TiO_2$ | $CrF_3 \cdot 6H_2O$ | 0.1 | Heat & Filter | A-10 |
| Example 11 | $TiO_2$ | $CrBr_3 \cdot 6H_2O$ | 0.1 | Heat & Filter | A-11 |
| Comparative Example 1 | $TiO_2$ | $CrCl_3 \cdot 6H_2O$ | 0.1 | Dry Mix | C-1 |
| Example 12 | $ZrO_2$ | $CrCl_3 \cdot 6H_2O$ | 0.1 | Heat & Filter | D-1 |
| Example 13 | $TiO_2$ | $CuCl_2 \cdot 2H_2O$ | 0.1 | Heat & Filter | E-1 |
| Example 14 | $TiO_2$ | $CuCl_2 \cdot 2H_2O$ | 0.025 | Heat & Filter | E-2 |
| Example 15 | $TiO_2$ | $CuCl_2 \cdot 2H_2O$ | 0.05 | Heat & Filter | E-3 |
| Example 16 | $TiO_2$ | $CuCl_2 \cdot 2H_2O$ | 0.2 | Heat & Filter | E-4 |
| Example 17 | $TiO_2$ | $CuCl_2 \cdot 2H_2O$ | 0.3 | Heat & Filter | E-5 |

<Evaluation Method>

With reference to the resulting samples, each ability of the photocatalyst was evaluated in accordance with vapor phase decomposition of 2-propanol.

Specifically, an equivalent amount (300 mg) of each sample was placed into a container (volume: 500 ml), and the container was filled with 2-propanol. Thereafter, $TiO_2$ series (except for Example 12) were irradiated with visible light (intensity: 1 mW/cm$^2$) in which the wavelength was controlled in the range of 450 to 580 nm using a Xenon lamp and glass filters B-46, Y-47, and C-40C. Then, acetone which is the decomposed product and $CO_2$ concentration were evaluated. Further, $CO_2$ was evaluated using the quantum efficiency QE as described hereinafter.

In $ZrO_2$ series (Example 12), ultraviolet light (intensity: 1 mW/cm$^2$) in which the wavelength was controlled in the range of 340 to 410 nm using the Xenon lamp and glass filters UV-34, V-40, and UV-D3 was used as the irradiation light.

<<Quantum Efficiency QE>>

When the decomposition of 2-propanol is assumed, the following equation is given. In other words, it is assumed that six photons are required to decompose 2-propanol and to generate $CO_2$.

$$\tfrac{1}{3}C_3H_8O + \tfrac{5}{3}H_2O + 6h^+ \rightarrow CO_2 + 6H^+$$

Therefore, the quantum efficiency QE ($QE_{CO2}$) of $CO_2$ generation may be described as follows:

$QE_{CO2}$=6×($CO_2$ generation rate)/(rate of absorption of irradiated photons)

<<Evaluation 1>>

For the sample A-1 of Example 1 and the sample C-1 of Comparative example 1, changes in acetone concentration and $CO_2$ concentration after the light irradiation were measured. The results are shown in FIG. 2. In FIG. 2, a horizontal axis shows the time after the light irradiation, a vertical axis (right) shows the acetone concentration (ppm), and a vertical axis (left) shows the $CO_2$ concentration (ppm). Further, in FIGS. 2, ● and ○ indicate the sample A-1 (●: changes in $CO_2$ concentration of the sample A-1, ○: changes in acetone concentration of the sample A-1); ■ and □ indicate the sample C-1 (■: changes in $CO_2$ concentration of the sample C-1, □: changes in acetone concentration of the sample C-1).

FIG. 2 shows that acetone (○) was 1st generated in the sample A-1 and then carbon dioxide (●) was generated. This shows that 2-propanol was first decomposed to acetone by photocatalysis of the sample A-1 and further decomposed to carbon dioxide.

On the other hand, in the sample C-1, small amounts of acetone (□) and carbon dioxide (■) were generated with time. That is, it is found that the sample does not exhibit photocatalysis.

FIG. 2 shows that the production method according to the present invention can produce a material exhibiting photocatalysis under visible light.

<<Identification>>

When the presence of chlorine (Cl) in the sample A-1 (Example 1) and the sample C-1 (Comparative example 1) was examined by X-ray photoelectron spectroscopy (XPS), chlorine (Cl) was not detected in the sample A-1 (Example 1). On the other hand, chlorine (Cl) was detected in the sample A-1 (Example 1).

With reference to the sample A-1 (Example 1) and the sample C-1 (Comparative example 1), the ultraviolet-visible absorption spectra in the region of 200 to 800 nm were measured. (1-reflectance) (=degree of absorption) is plotted as a vertical axis, which is shown in FIG. 3 ((X) and (Y)). In FIG. 3, (X) is a observed result, and (Y) is a result obtained from the observed results. That is, in (X) of FIG. 3, solid lines show the observed results of (A) sample A-1 (shown as "Impregnated (A)" in Example 1 and the drawing) and (B) sample C-1 (shown as "Dry-mixed (B)" in Comparative example 1 and the drawing) and a dotted line shows the observed result of rutile type titanium dioxide used in Examples (except for Example 12). Further, in (Y) of FIG. 3, a solid line shows a difference (A)−(B) between observed results (A) and (B)

FIG. 3 shows that the absorptions based on a d-d transition of $Cr^{3+}$ are observed near 450 nm and near 620 nm in (A) and (B).

In the results of (A)−(B) ((Y) of FIG. 3), the absorption is observed near 450 nm. The absorption is a new absorption which is not observed in Comparative example 1 (the dry-blending method), suggesting an electronic transition from $Cr^{3+}$ to the conduction band of $TiO_2$.

From these absorptions, it is found that the sample A-1 (Example 1) has a six-coordination of $Cr^+$.

Further, chlorine (Cl) was not detected as the result of XPS of the sample A-1 (Example 1); nothing except water (including hydrates) was used in the process of preparing the sample A-1; and the absorption showing the electronic transition from $Cr^{3+}$ to the conduction band of $TiO_2$ was observed. For this reason, it is considered that the sample A-1 (Example 1) has a structure of an aqua complex of $[Co(H_2O)_{6-x}]^{2+}$ and the aqua complex is chemically adsorbed on $TiO_2$.

<Evaluation 2>

With reference to the samples A-1 to A-7, the $CO_2$ generation rate and the quantum efficiency $QE_{CO2}$ of $CO_2$ generation was measured. The results are shown in FIG. 4.

In FIG. 4, a horizontal axis shows the amount of salt (concentration of Cr), a vertical axis (right) shows the quantum efficiency $QE_{CO2}$. (○), and a vertical axis (left) shows the $CO_2$ generation rate (●).

From FIG. 4, it is found that there is an optimal value in the Cr holding amount and the optimal value is 0.1 wt %.

<Evaluation 3>

With reference to the samples A-1 and A-8 to A-11, the quantum efficiency $QE_{CO2}$ of $CO_2$ generation was measured. The results are shown in Table 2.

As is apparent from Table 2, in particular, the sample A-9 of Table 2, it is found that a high quantum efficiency $QE_{CO2}$ was achieved in the absence of halogen. From this result and the result of XPS, it is found that the samples A-1 (to A-7) and the samples A-8 to A-11 according to the present invention exhibited photocatalysis responsive to visible light in the absence of halogen.

TABLE 2

| Sample | Oxide | Salt | Amount of Salt Wt % | $QE_{CO2}$ % |
|---|---|---|---|---|
| A-1 | Ex. 1 | $TiO_2$ | $CrCl_3 \cdot 6H_2O$ | 0.1 | 1.7 |
| A-8 | Ex. 8 | $TiO_2$ | $Cr(ClO_4)_3 \cdot 6H_2O$ | 0.1 | 1.6 |
| A-9 | Ex. 9 | $TiO_2$ | $Cr(NO_3)_3 \cdot 6H_2O$ | 0.1 | 1.9 |
| A-10 | Ex. 10 | $TiO_2$ | $CrF_3 \cdot 6H_2O$ | 0.1 | 1.3 |
| A-11 | Ex. 11 | $TiO_2$ | $CrBr_3 \cdot 6H_2O$ | 0.1 | 1.0 |

<Evaluation 4>

When the generation of acetone and $CO_2$ was observed in the sample D-1 (oxide: $ZrO_2$), the same behavior as that of the sample A-1 in FIG. 2 was exhibited (not shown). This shows that the sample D-1 also exhibited photocatalysis. Furthermore, when the quantum efficiency $QE_{CO2}$ of $CO_2$ generation as to the sample D-1 was measured, the value was 0.050%. The reason why the QE is small is that the electron mobility of $ZrO_2$ is small. In other words, the cause is believed to be the low electron acceptability.

<Evaluation 5>

When the generation of acetone and $CO_2$ was observed in the samples E-1 to E-5, the same behavior as that of the sample A-1 in FIG. 2 was exhibited (not shown). This showed that the samples E-1 to E-5 also exhibited photocatalysis under visible light.

With reference to the samples E-1 to E-5, the quantum efficiency $QE_{CO2}$ of $CO_2$ generation was measured. The results are shown in FIG. 5.

From FIG. 5, it is found that the quantum efficiency $QE_{CO2}$ is high (about 7%) in the sample E-1 (weight percentage of Cu: 0.1%).

What is claimed is

Figure 1:
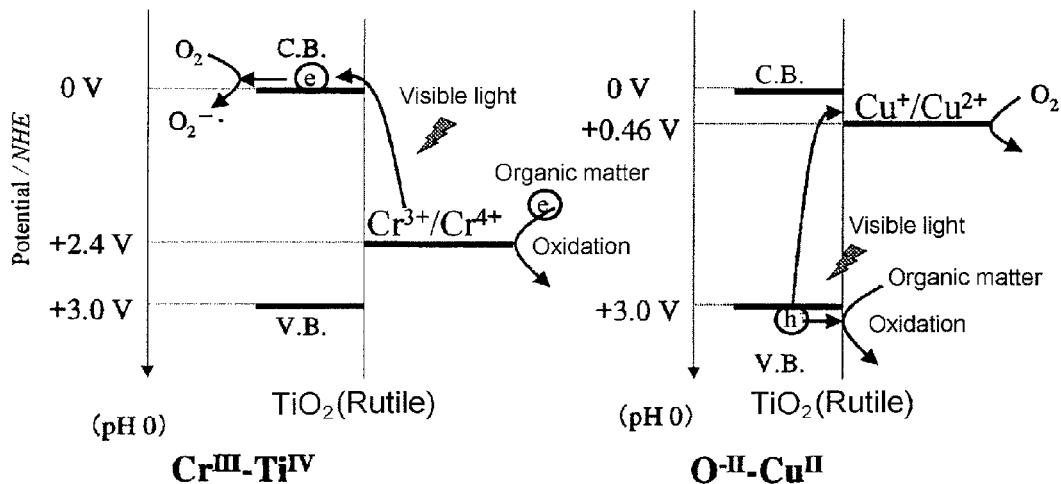
FIG. 1 is a diagram explaining the photocatalysis mechanism of the photocatalyst material according to the present invention.
Figure 2:
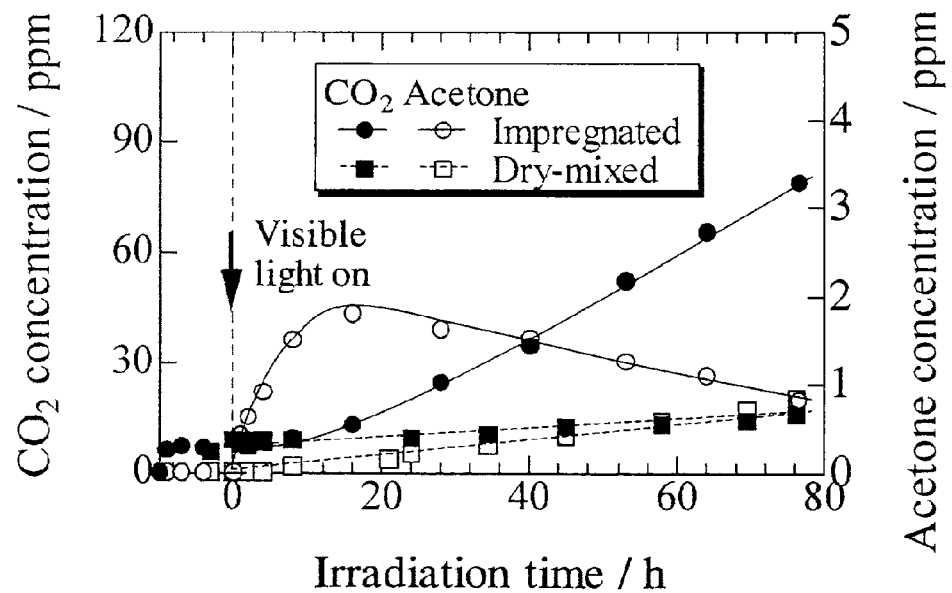
FIG. 2 is a diagram showing results of measurement of changes in acetone concentration and $CO_2$ concentration after the light irradiation for the samples A-1 and C-1.
Figure 3:
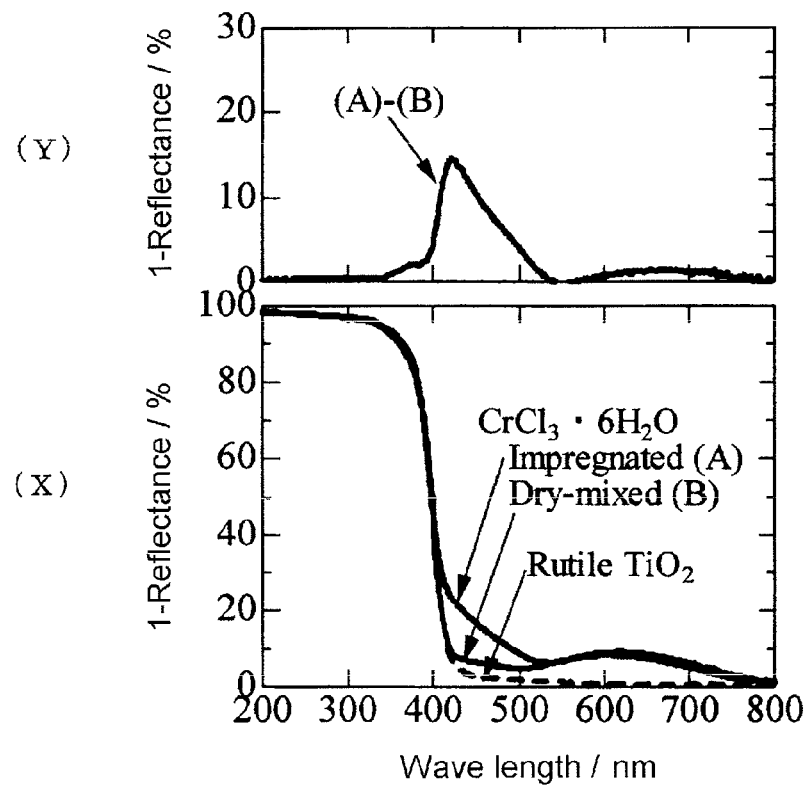
FIG. 3 is a diagram including (X) which shows results of ultraviolet-visible absorption spectra of (A) the sample A-1, (B) the sample C-1, and the rutile type titanium dioxide, i.e., a raw material, and (Y) which shows results of (A)-(B).
Figure 4:
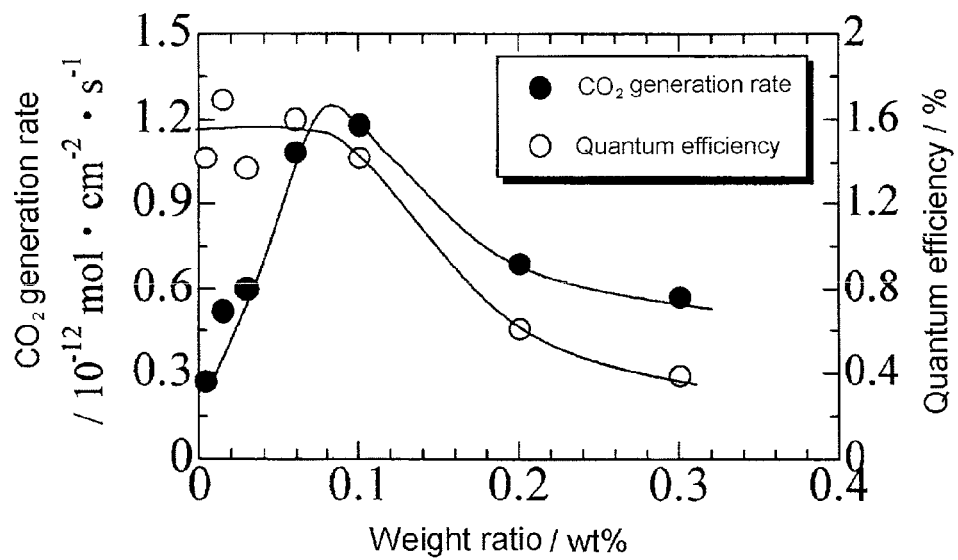
FIG. 4 is a diagram showing results of measurement of the $CO_2$ generation rate and the quantum efficiency $QE_{CO2}$ of $CO_2$ generation for the samples A-1 to A-7.
Figure 5:
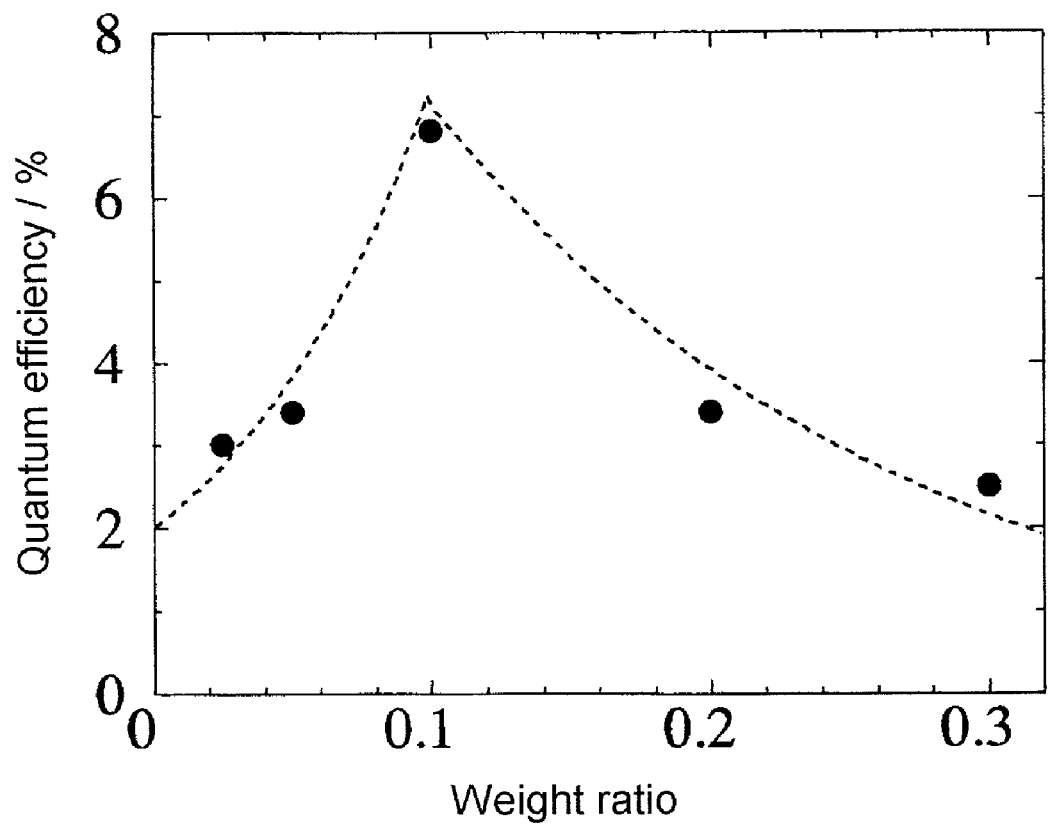
FIG. 5 is a diagram showing results of measurement of the quantum efficiency $QE_{CO2}$ of $CO_2$ generation for the samples E-1 to E-5.

1. A photocatalyst material comprising: a) an oxide of a first metal; and b) an aqua complex of a second metal;
   wherein the redox potential of a valence band of the oxide of the first metal is greater than or equal to 2.0 V vs. standard electrode potential, at pH=0,
   the redox potential of a second metal ion in the aqua complex of the second metal is less than or equal to 1.1 V vs. standard electrode potential, at pH=0, and
   the aqua complex of the second metal is chemically adsorbed on the oxide of the first metal,
   wherein the second metal ion is $Cu^{2+}$ or $Fe^{3+}$.

2. The material according to claim 1, wherein a) the oxide of the first metal is selected from the group consisting of $TiO_2$, $ZrO_2$, ZnO, $Ta_2O_5$, $Nb_2O_5$, $SrTiO_3$, $NaTaO_3$, $KTaO_3$, $NaNbO_3$ and $KNbO_3$.

3. The material according to claim 1, wherein the photocatalyst material is responsive to visible light.

4. A process for producing a photocatalyst material comprising a) an oxide of a first metal; and b) an aqua complex of a second metal;
   wherein the aqua complex of the second metal is chemically adsorbed on the oxide of the first metal,
   wherein the redox potential of a valence band of the oxide of the first metal is greater than or equal to 2.0 V vs. standard electrode potential, at pH=0,
   the redox potential of a second metal ion in the aqua complex of the second metal is less than or equal to 1.1 V vs. standard electrode potential, at pH=0, and
   the process comprises the steps of:
   i') suspending the oxide of the first metal in water, to produce a suspension;
   ii') adding the second metal ion source to the suspension;
   iii') heating the resulting liquid at 40 to 100° C.;
   iv') filtering the resulting liquid, followed by washing, to produce fine particles; and
   v') drying the resulting fine particles at 50 to 300° C., to produce the photocatalyst material,
   wherein the second metal ion is $Cu^{2+}$ or $Fe^{3+}$.

5. A method for decomposing a contaminant by using a photocatalyst material comprising a) an oxide of a first metal; and b) an aqua complex of a second metal;
   wherein the redox potential of a valence band of the oxide of the first metal is greater than or equal to 2.0 V vs. standard electrode potential, at pH=0,
   the redox potential of a second metal ion in the aqua complex of the second metal is less than or equal to 1.1 V vs. standard electrode potential, at pH=0,
   the aqua complex of the second metal is chemically adsorbed on the oxide of the first metal,
   the method comprises the steps of:
   irradiating the photocatalyst material with light to excite an electron in the valence band of the oxide into the second metal ion of the aqua complex, and
   decomposing a contaminant by the effect of the excited electron,
   wherein the second metal ion is $Cu^{2+}$ or $Fe^{3+}$.

* * * * *